W. W. MOYER.
MACHINE FOR MAKING STYLI.
APPLICATION FILED APR. 28, 1916.

1,251,909.

Patented Jan. 1, 1918.
7 SHEETS—SHEET 1.

WITNESS
F. J. Hartman.

INVENTOR
William W. Moyer.

BY
Fenton Blount
ATTORNEYS

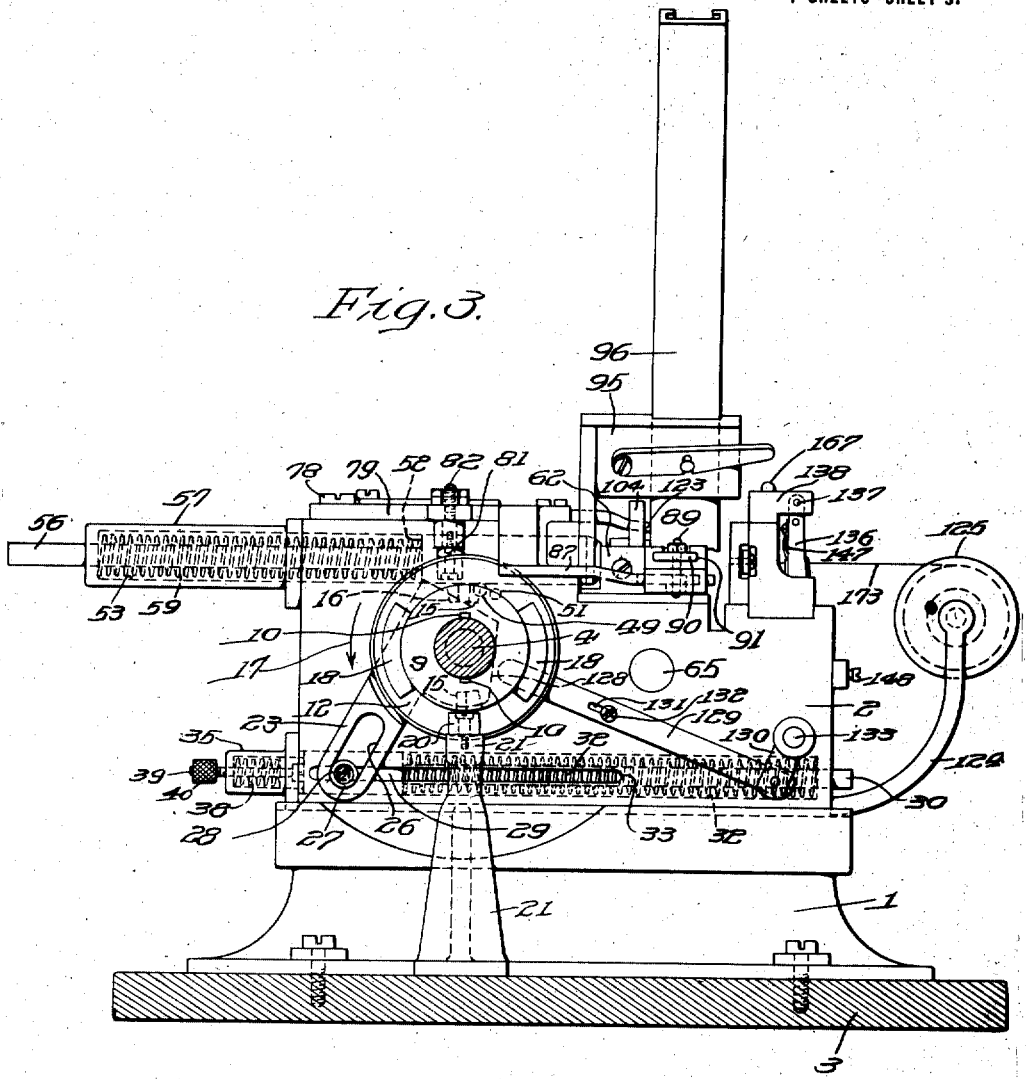

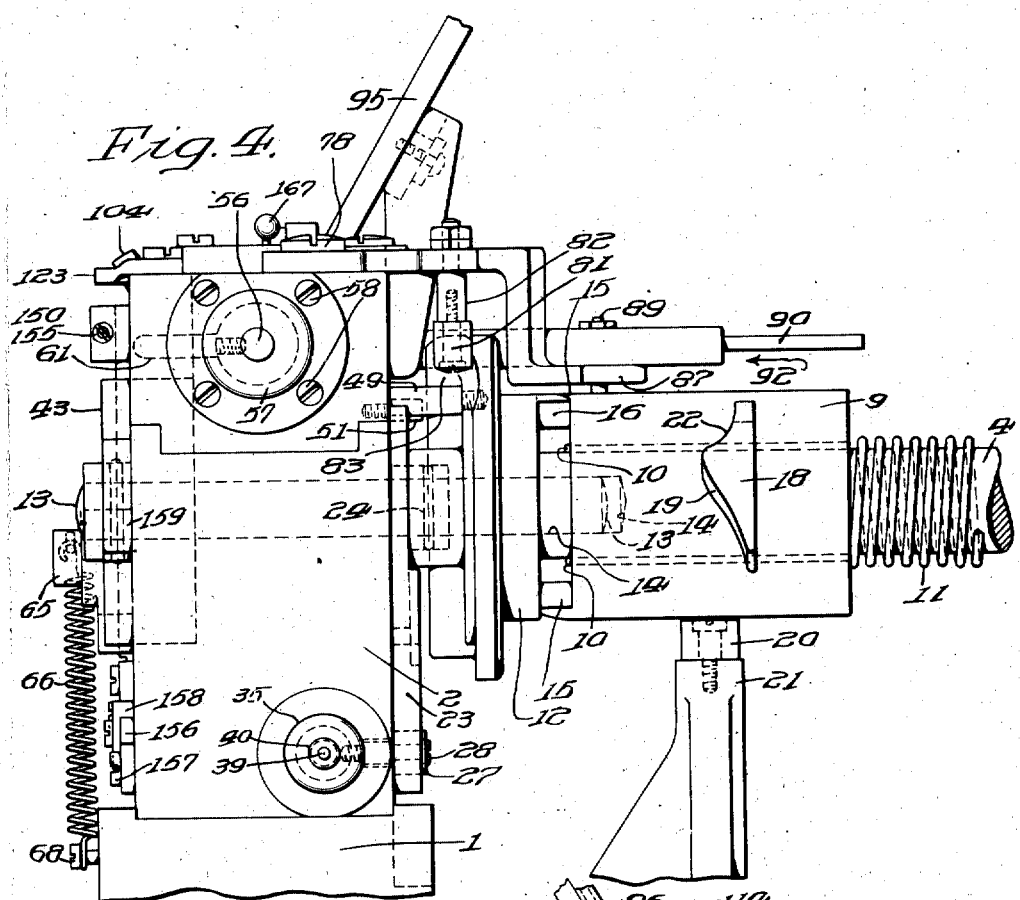
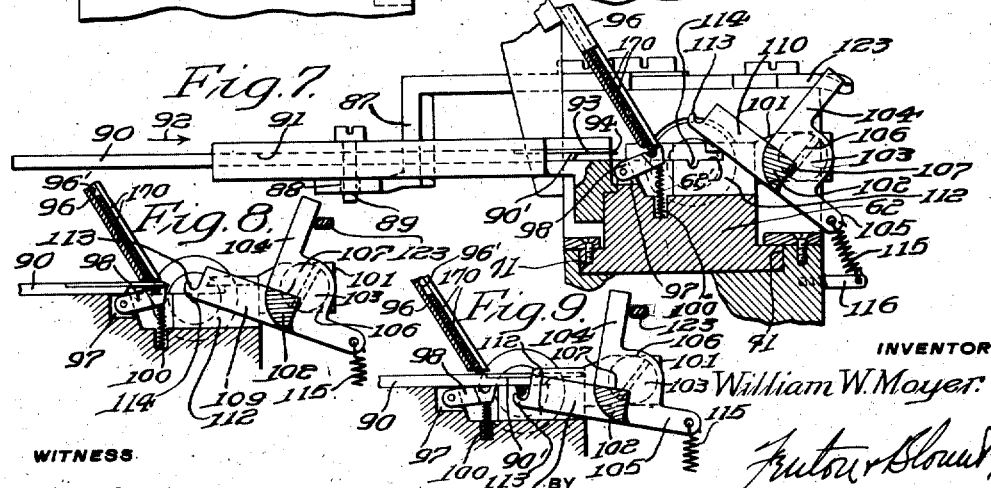

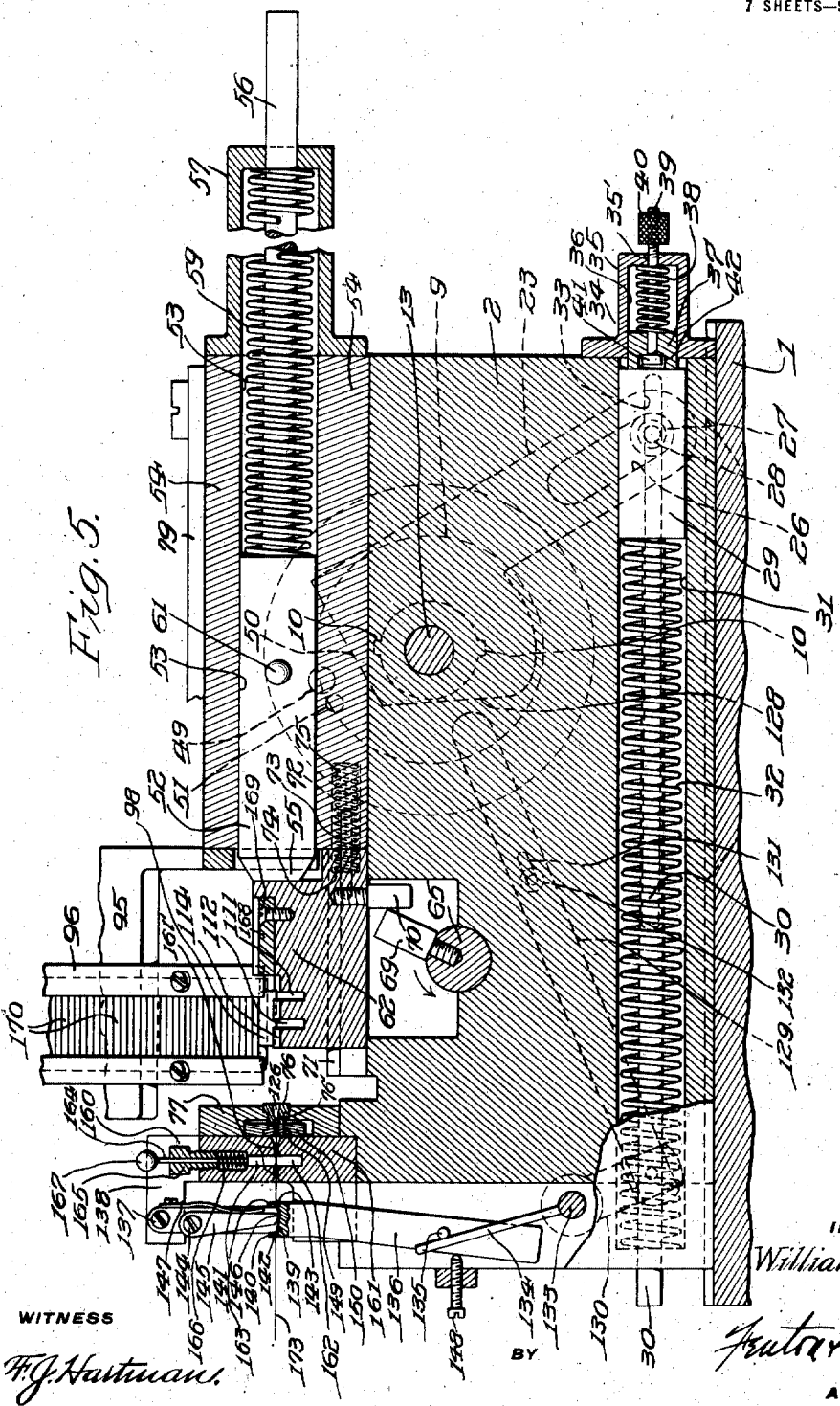

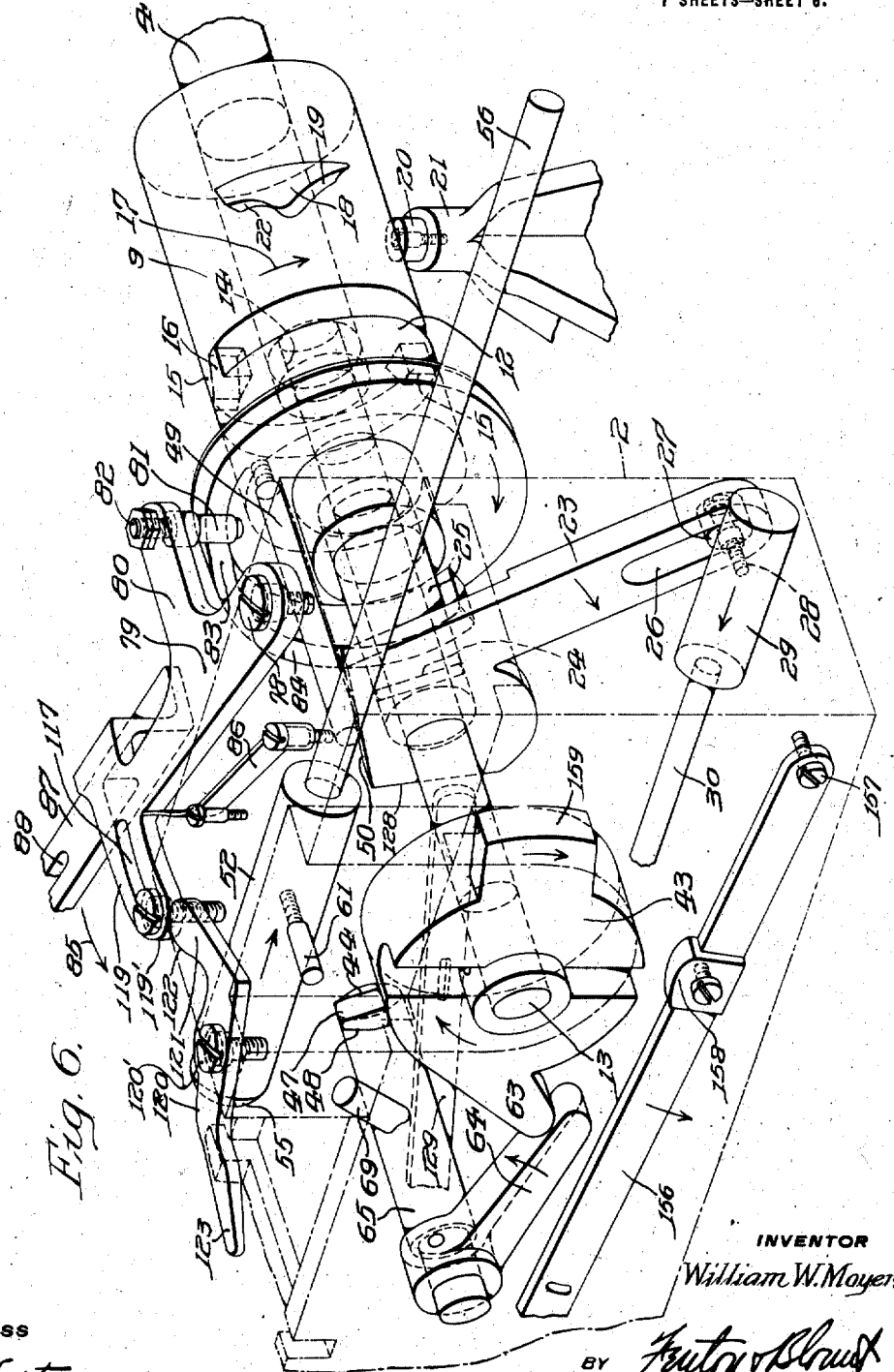

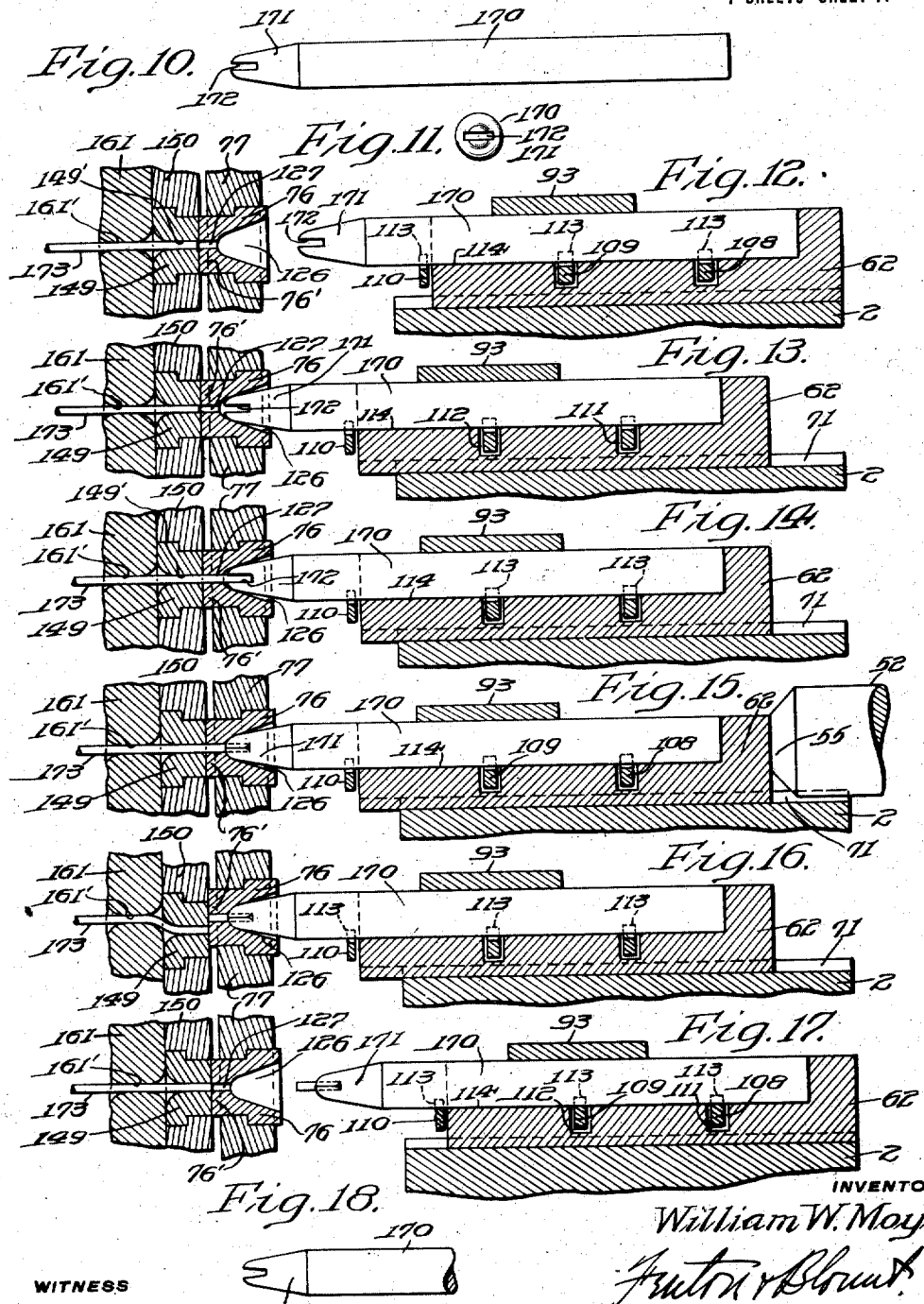

UNITED STATES PATENT OFFICE.

WILLIAM W. MOYER, OF CAMDEN, NEW JERSEY, ASSIGNOR TO VICTOR TALKING MACHINE COMPANY, A CORPORATION OF NEW JERSEY.

MACHINE FOR MAKING STYLI.

1,251,909.  Specification of Letters Patent.  Patented Jan. 1, 1918.

Application filed April 28, 1916. Serial No. 94,105.

*To all whom it may concern:*

Be it known that I, WILLIAM W. MOYER, a citizen of the United States, and a resident of Camden, in the county of Camden, State of New Jersey, have invented certain new and useful Improvements in Machines for Making Styli for Use in Connection with the Reproduction of Sound from Talking-Machine Records, of which the following is a full, clear, and exact disclosure.

My invention relates to machines for making styli for sound reproducing machines and particularly to machines in which the point or record-engaging tip or point of the stylus is composed of a different material from that of the shank or body portion of the stylus, the machine of this application being for the purpose of uniting a record-engaging tip or point to a shank or body portion of a stylus in such a manner that the shank and tip or point are so firmly united as to form a substantially unitary stylus having a shank or body portion of one material and an extremely small fine insert in the end thereof of a different material forming the record-engaging tip thereof.

It has been discovered that tungsten or tungstenic material possesses properties which make it peculiarly adapted for styli for reproducing sound from talking machine tablets. A stylus of tungsten or tungstenic material has little or no injurious effect upon the walls of a sound record groove of a sound record tablet in reproducing sound from such a tablet, and it may be used a large number of times on the same or on different records without injury to the walls of the sound record grooves. The record-engaging tip or point appears to wear rapidly at first until that portion thereof which is in actual engagement or contact with the sound record groove, conforms to the shape of and fits the groove, but after such shape of the tip of the stylus has been once attained, the wear of the said tip is thereafter negligible or inappreciable during the reproduction of sound from the remainder of the said groove, or so long as the shape conforms to the groove of a record with which it is being used or is to be used.

These properties then relate to a great extent to the effects produced by that portion of the stylus which is in actual engagement with the walls of the sound record groove. They relate to the record-engaging tip as distinguished from the shank or body portion of the stylus, which does not come into actual contact with the walls of the sound record groove. Tungsten is an expensive material, and, therefore, if the record-engaging tip alone be formed of tungsten or tungstenic material, the properties above specified would characterize a stylus irrespective, generally speaking, of the material employed for the shank.

Tungsten is, however, a difficult metal to work, and it is not readily united or joined to other metals as for instance by welding, brazing or soldering, particularly when the tungsten is in the form of a wire of small diameter, as for instance, of a diameter substantially the same as or even smaller than the width of a sound record groove in a commercial sound record tablet.

One object of the present invention is to produce a stylus in which the record-engaging tip or point is of tungsten or tungstenic material, and the body portion of which is of a cheaper and more easily wrought material, such as steel.

Other objects of this invention are to unite a tungsten tip to a metal shank; to unite a tungsten tip to a shank of malleable metal by a swaging action; to swage the metal of a shank tightly around and into substantially unitary engagement with a tungsten wire insert, the diameter of the tungsten wire being of about the width of a sound record groove in a commercial sound record tablet, that is to say, of about five or six one thousandths of an inch in diameter.

Another object of this invention is to provide a machine which will swage a malleable metal shank into tight holding engagement with an insert of the tungsten wire.

A further object of my invention is to construct a machine by which fine tungsten wire is inserted into a recess provided in the end of a shank of steel or other malleable metal, and the metal of the shank is pressed, forced or swaged into unitary engagement with the tungsten wire thus inserted. Various forms of mechanisms might be provided for uniting the tungsten wire to the stylus shank but I have found that an efficient form of mechanism for accomplishing this result is one in which the tungsten wire and the material forming the stylus shank are brought together in a swaging die and a swaging blow delivered to the shank to force the material of the shank into tight engagement with the tungsten wire. The objects of this invention are to provide a mechanism which will accomplish these operations in an efficient manner and it is apparent that other forms than the one specifically disclosed in the application could be readily made to effect the same result so long as the mechanism provides a means for feeding the tungsten wire through the die in pre-determined lengths, means to hold the shank material and provide a relative movement between the die and shank holder to bring the wire into a suitable recess in the end of the shank, and means to deliver a swaging blow to the shank to unite the two.

Other objects of my invention will appear in the specification and claims below.

Referring to the drawings forming a part of this application in which the same reference characters are used throughout the views to designate the various parts—

Fig. 3 is a rear view of the same, the driving mechanism in the rear of the machine being removed;

Fig. 4 is an end view of the machine looking from the right hand side of Fig. 1, the same being on a larger scale than the scale of Figs. 1 to 3 inclusive;

Fig. 5 is a longitudinal section on an enlarged scale of the mechanism for operating the hammer and for inserting and cutting the fine tungsten wire;

Figure 1:
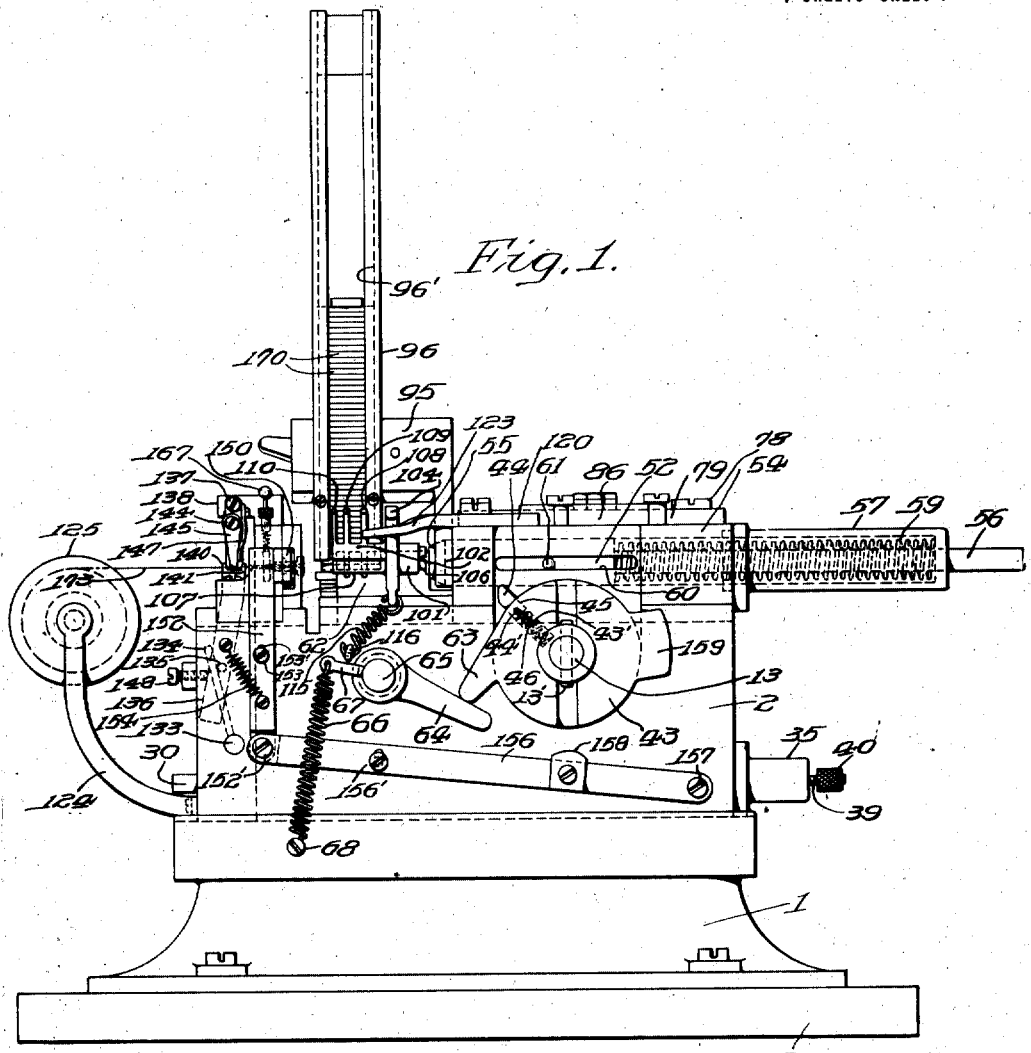
Figure 1 is a side elevational view of my improved machine for making styli of the character above described.

Fig. 6 is a diagrammatic isometric view of the main parts of the mechanism showing generally the relations of the operative parts to each other and the manner in which the various mechanisms are all actuated from the main or driving shaft of the machine, the driving shaft and parts of the clutch mechanism being shown as of greater length measured rearwardly than they are shown in the other drawings for the purpose of clearness;

Fig. 7 is a fragmentary sectional view showing the mechanisms for feeding the needle shanks one at a time to the swaging mechanism and for ejecting the needle from the machine after the record engaging tip has been inserted in and secured to the shank;

Figs. 8 and 9 are similar fragmentary sectional views of the main parts of the mechanism illustrated in Fig. 7 showing the positions of the parts at different times during the operation of the device;

Fig. 10 is a side elevational view and Fig. 11, an end view of a stylus shank before it is provided with a record engaging tip;

Figs. 12 to 17 are views on a greatly enlarged scale and somewhat diagrammatic in character, showing the relative movement of the stylus shank, the tungsten wire and principal parts of the machine during one cycle of the operation of the machine; and Fig. 18 is a view of a modified and preferred form of stylus shank which may be readily provided with a record engaging tip in the machine of this application.

The operative mechanism illustrated is preferably mounted on a pedestal 1, to the top of which is secured in any suitable manner the main block or casing 2 upon and in which are mounted the various parts and mechanisms of the machine. The pedestal 1 may be supported on a suitable table 3. The machine is preferably driven by a driving shaft 4 (see Fig. 2) extending rearwardly of the machine and having its rear end mounted in a bearing block 5. Said shaft 4 is provided with a worm gear 6 which preferably meshes with a worm 6' on the motor shaft 7 of the driving motor 8. During the operation of the machine, the motor 8, its shaft 7 and the worm 6' thereon, the gear 6, and the main shaft 4 are continuously rotated.

Upon the main shaft 4 is mounted clutch member 9, said clutch member being prevented from rotating upon said shaft 4 by splines 10—10 extending longitudinally of the shaft. Between the clutch member 9 and the bearing block 5 and surrounding the shaft 4 is a coiled spring 11, the tension of which is to normally force the clutch member 9 away from the bearing block 5 and into engagement with the coöperating clutch member 12, mounted on and loose with respect to the shaft 13, which in turn is mounted in and passes through the main block or casing 2. The shaft 13 is coaxial with the shaft 4 and its rear end is fitted into a cylindrical hole 14 in the adjacent end of the main shaft 4, as clearly appears in Figs. 2, 4 and 6.

Figure 2:
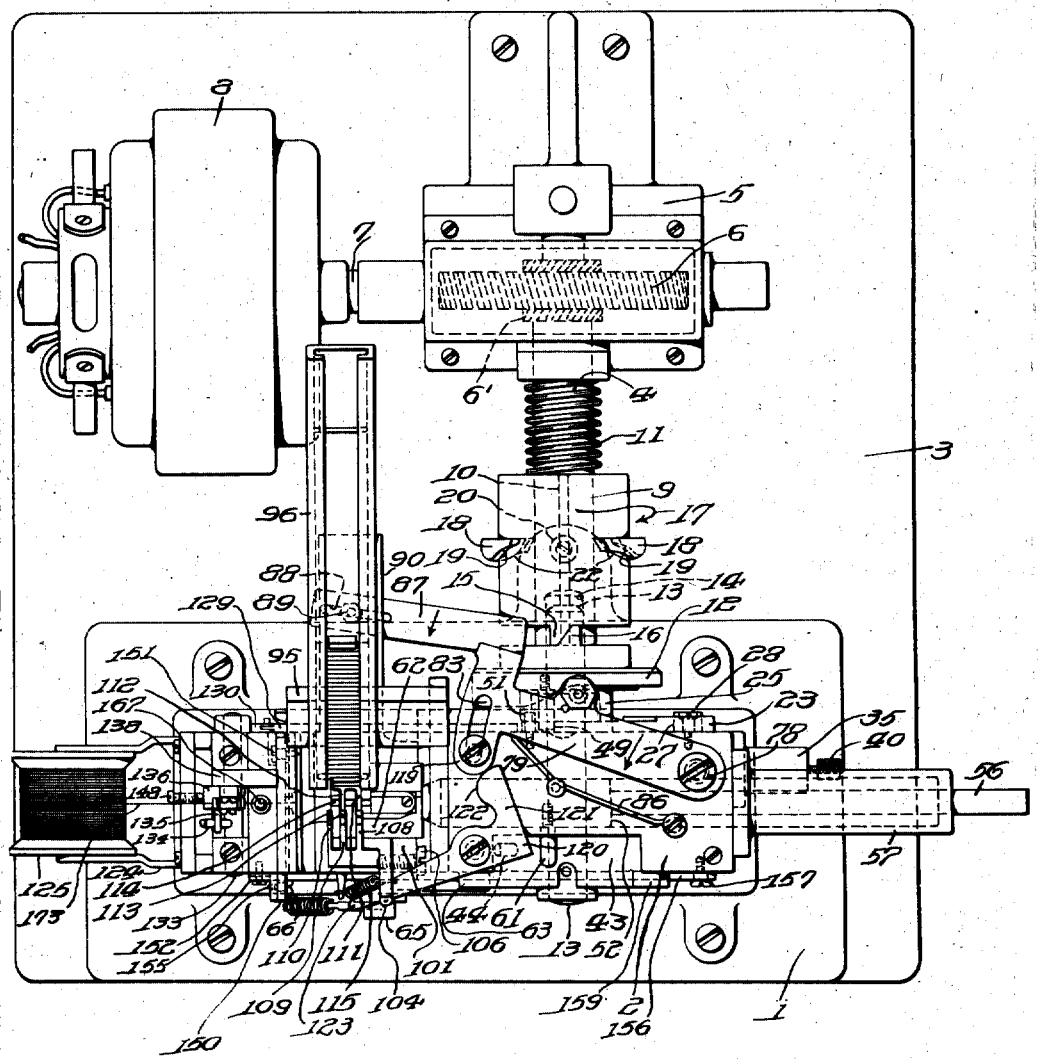
Fig. 2 is a plan view of the same.

The clutch member 9 is provided with a pair of oppositely disposed lugs 15—15 to coöperate with a lug 16, on the adjacent face of the clutch member 12, the two clutch members being held normally together and in engagement by the coiled spring 11, as is clearly shown in Figs. 2 and 4. The faces of the lugs 15—15 which alternately engage the lug 16 and the coacting face of the lug 16 are inclined to each other, as is clearly shown in Fig. 2, to permit of their ready separation during the operation of the machine.

The motor 8 is driven so as to impart a rotary movement to the shaft 4 and the clutch member 9 in the direction of the arrow 17, (Figs. 2, 3 and 6), during the operation of the machine, that is to say, in clockwise direction to the operator standing in front of the machine.

The clutch member 9 is also provided upon its exterior surface with a pair of oppositely disposed double-wedge-shaped cams 18—18, the low parts of the cam surfaces 19—19 of which lie in a plane tangent to the rear side of a roller 20 mounted on a suitable support or bracket 21 on the table 3 of the machine. As the shaft 4 is continuously rotated, the cam lugs 18—18 are successively brought into engagement with the roller 20, and, by reason of this engagement, the clutch member 9 is forced rearwardly against the action of the coiled spring 11, to intermittently withdraw the clutch member 9 from engagement with the clutch member 12 twice during every revolution of the shaft 4. The surfaces 22—22 of the cams 18—18 permit the clutch member 9 to gently move under the action of the coiled spring 11 back into engagement with the clutch member 12 as the cams 18—18 move out of engagement with the roller 20.

Upon the shaft 13 and bearing against the rear face of the block or main casing 2, is a lever 23 secured to the shaft 13 by a pin 24 passing through the hub 25 of the lever 23 and the shaft 13. (See Fig. 6). Said lever 23 is provided at its free end with a slot 26 extending substantially longitudinally thereof and within which is mounted a roller 27 smoothly fitting in the said slot 26, said roller 27 being mounted on a screw or stud 28 which in turn is secured to the head 29, secured to the rod 30 mounted in a suitable hole or opening 31 extending longitudinally of the main block or casing 2. Around the rod 30 and between the head 29 and the bottom of the hole or recess 31, is a coiled spring 32, the tension of which is to force the head 29 and the rod attached thereto to the right hand of the machine. (See Fig. 5.).

The main block or casing 2 is provided with a longitudinal slot 33 through which the screw or stud 27 extends. The head 29 is normally held by the spring 32 against a cushioning device or shock absorber 34 comprising the casing 35, having a cylindrical opening 36 therein within which is fitted a piston head 37. Between the piston head 37 and the bottom of the cylindrical opening 36 is provided a coiled spring 38, tending to force the piston head out of the said cylindrical opening, the device being provided with an adjusting screw 39 passing through the piston head 37 and through the casing 35 and within the coiled spring 38, the end of the adjusting screw outside of the casing 35 being provided with a nut 40. The purpose of the screw nut 40 is to prevent the piston head 37 from being forced out of the cylindrical opening 36 by the coiled spring 38 when the head 28 of the rod 30 is not in engagement therewith. One end of said adjusting screw 39 passes freely through an opening 35', in the casing 35 and the other end is provided with a head 41 seated in a recess 42 in the face of the piston head 37. The casing 35 may be secured to the end of the main block or casing 2 in any suitable manner.

Secured to the front end of the shaft 13 by a pin 13' and bearing against the front face of the main block or casing 2 is a cam 43 projecting from the surface of which is a tooth 44. This tooth 44 is mounted in said cam 43 and extends radially therefrom. It is mounted in a recess 45 and is normally held projecting beyond the exterior surface of the cam 43 by a spring 46 within said recess 45 and tending to force said tooth 44 outwardly to a position in which the outer end of a transverse pin 44' in the tooth 44 bears against the outer end of a radial slot 43' in the body of the cam 43. The said tooth is provided with a radial flat face 47 and with an inclined face 48.

The clutch member 12 which, as above stated, is loose with respect to the shaft 13 and with respect to the hub 25, is provided with a pin or lug 49 extending toward the front of the machine and adapted, as the clutch member 12 is revolved to come into engagement with the surface 50 of the lever 23, the movement of said clutch member 12 in an anti-clockwise direction being limited by a stop pin 51 projecting rearwardly from the rear face of the main block or casing 2. (See Figs. 5 and 6).

Mounted longitudinally of the main block or casing 2 and above the rod 30 which for convenience will be termed the re-setting rod or plunger, is the hammer 52. This hammer is mounted in a cylindrical hole 53, extending longitudinally of the hammer casing 54 and consists of the hammer head 55 and the guide rod 56 extending rearwardly therefrom and freely through a cap 57 on the right hand end of the hammer casing 54. This cap is secured to the end of the casing 54 in any suitable manner as by screws 58. Within the hole or opening 53 and surrounding the guide rod 56 and pressing against the rear side of the hammer head 55 and the inner side of the cap 57 is a stiff coiled spring 59, the tension of which is to normally force the hammer head 55 in a direction away from the cap 57. Secured to the hammer head 55 and extending laterally outwardly through the hammer casing 54 of the hammer and through a longitudinal slot 60 in the casing 54, is a hardened steel pin 61 extending into the path of the spring pressed tooth 44. This hammer is actuated by the spring pressed tooth 44 and the coiled spring 59. As the shaft 13 turns clockwise the straight or radially flat face 47 of the tooth 44 comes into engagement with the hard steel pin 61 and moves the hammer from the position shown in Fig. 5 against the tension of the coiled spring 59 until the outer edge or point of the tooth 44 passes beyond and out of engagement with the said steel pin 61. Immediately upon the release of the pin 61 from the tooth 44, the coiled spring 59 is free to act and impels the hammer head 55 forwardly away from the cap 57 and against the needle carrier 62, imparting a sharp heavy blow thereto. (See Figs. 1 and 5).

The mechanism for moving the needle carrier 62 will be next described, particular reference being had to Figs. 1, 5 and 6.

The cam 43 is provided with a projection 63 in engagement with which a lever 64, rigidly secured to a rock shaft 65, is normally held by a spring 66 having one end secured to a lever 67, also secured to the rock shaft 65, and its other end secured to a stud 68 in the top of the pedestal 1. This rock shaft 65 is provided with a radially extending stud or arm 69 adapted to engage a depending stud 70 projecting from the bottom of the needle carrier 62. The needle carrier 62 is mounted to move in alinement with the hammer head 55 in guide-ways 71—71. (See Figs. 5 and 7.) Between the hammer casing 54 and the needle carrier 62 are one or more similarly arranged and similarly acting coiled springs, one of said springs 72 being shown in Fig. 5. Said coiled spring 72 is mounted on and surrounds a stud or pin 73 in an opening 74 in the needle carrier 62 and extends into an alined opening 75 in the hammer casing 54. This spring 72 is a compression spring and its tension is such as to tend to force the needle carrier 62 away from the end of the hammer casing 54. If more than one spring is used, their mountings and functions will be like those of spring 72. Now, as the shaft 13 begins to revolve clockwise due to the engagement of the clutch members 9 and 12, and the engagement of the pin 49 with the surface 50, the cam 43 on the shaft 13 also turns in a clockwise direction and the lever 64, held in engagement with the finger or projection 63 of the cam 43 follows the projection 63 by reason of the tension of the coiled spring 66, and the rock shaft 65, moves in an anti-clockwise direction, thus allowing the coiled spring 72 to move the needle carrier 62 in the guide-ways 71—71 away from the hammer casing 54, until the end of the needle shank carried thereby comes into engagement with the cup-shaped die 76, rigidly mounted in the anvil 77, as will be later referred to.

When, however, the clutch members 9 and 12 have been withdrawn from engagement with each other, and the cam 43 returns to its normal position shown in Fig. 1, the projection 63 will reëngage the lever 64 and will move the rock shaft 65 in the reverse or clockwise direction compressing the spring 72 and moving the needle carrier 62 back into engagement with the end of the hammer casing 54.

Pivoted on a stud or pin 78 on the top of the hammer casing 54 is a lever 79 having a projection 80 depending from which is a roller 81 mounted on a stud 82 secured to said projection 80. Said roller 81 extends downwardly and into the path of a cam 83 mounted on and rigidly secured to the loose clutch member 12. Said cam 83 has a cam surface 84 so arranged that as the cam 83 turns in a clockwise direction it swings the lever 79 in the direction of the arrow 85. (See Fig. 6.) When the cam 83 is oscillated with the shaft 13 in the reverse or anti-clockwise direction, the leaf spring 86 holding the roller 81 against the cam surface 84, moves the lever 79 in the reverse direction. Thus, after every oscillation of the shaft 13, the lever 79 is given an oscillatory movement. The lever 79 is provided with an arm 87 provided with a longitudinal slot 88 into which projects and is fitted a pin or stud 89, (see Figs. 2, 3, 4, 6 and 7), said stud being rigidly secured to a pusher rod 90 mounted to oscillate longitudinally in guide-ways 91 as the arm 87 of the lever 77 is oscillated in the manner above described. This oscillation of the lever 79 thus imparts a longitudinally reciprocatory motion to the pusher rod or slide 90.

Referring now to Figs. 7, 8 and 9, the inner end of the pusher rod or slide 90 is provided with a thin resilient plate 93, having a sharp edge 94 projecting beyond the end of the pusher rod 90. Secured to the back of the hammer casing 54 is a bracket 95 upon which is mounted a needle magazine 96, provided with a slot 96' adapted to contain a plurality of shanks or body portions of the needles or styli. In this magazine 96, the needle shanks are arranged parallel to the axis of the hammer and one above the other. The lower needle or needle shank in the magazine is in a position slightly above the horizontal plane passing through the axis of the hammer. Pivoted to the needle carrier 62 in a slot or recess 97 is a lever 98, the free end of which is provided with a groove 99 in which the lowermost needle is supported. The free end of the lever 98 is pressed against the bottom of the needle magazine 97 by a coiled spring 100.

The needle carrier 62 is also provided with a lug 101 upon which is pivotally mounted a needle ejector 102, the same consisting of a bell crank lever 103 provided with an operating arm 104 and a spring attaching arm 105, the bell crank lever 103 being secured to the lug 101 by a stud or screw 106. Said bell crank lever 103 is provided on its face with a projection 107 extending parallel to the axis of the hammer head 55 and from which laterally project three needle ejecting fingers, 108, 109 and 131

110, of which the fingers 108 and 109 are adapted to be swung into slots 111, 112 respectively in the needle carrier to a position whereby the hooked ends 113 of the fingers 108, 109 and 110 lie below a horizontal plane passing through the center of the hammer.

The needle carrier 62 is provided with a flat upper surface 62′ and with a groove 114, the bottom of which is semi-circular and the center of curvature of which is in alinement with the axis of the hammer head 55, said groove being of the depth equal to the diameter of the shank of the stylus.

A spring 115 has one end attached to the free end of the spring attaching arm 105 of the bell crank lever 103 and its other end attached to a stud or pin 116, the tension of which is such as to normally hold the needle ejecting fingers in an elevated position, such as is shown in Fig. 7.

The lever 79 is preferably provided with a slot 117 through which passes a stop pin or screw 118, the slot being concentric with the stud or pin 78 upon which the lever 79 is pivoted and the said slot 117 freely positioned in a laterally projecting arm 119 of said lever 79, the surface 119′ of the end of said arm 119 being preferably substantially semicircular. Upon the upper surface of hammer casing 54 is the lever 120 for communicating motion from the lever 79 to the needle ejecting fingers. This lever 120 is substantially a bell crank lever having the arm 121 provided with a curved surface 122, normally pressing against the surface 119′ of the laterally projecting arm 119 of the lever 79 and having its other arm 123 projecting outwardly and under the lever engaging arm 104. The spring 115 exerts sufficient tension to draw or lift the needle ejecting fingers 108 to 110 upwardly with considerable force and to hold the surface 122 of the arm 121 in engagement with the surface 119′ of the projecting arm 119 of the lever 79.

Mounted upon the end of the main block or casing 1 is a bracket 124, the upper end of which is provided with a reel 125, adapted to contain a coil of fine tungsten wire 173 which wire passes through a wire feeding mechanism, a tension device 160, a wire cutter 149 and into a swaging die 76. The die 76 is of hard steel and has a cup-shaped opening 126 in the face thereof adjacent the hammer head 55 and the bottom of said die is provided with a minute axial opening 127, slightly larger than the diameter of the tungsten wire 173 to be fed therethrough. Said die 76 is preferably threaded into a heavy block of steel forming the anvil 77, rigidly secured to the main block or casing 2 in any suitable manner.

For feeding or advancing the tungsten wire into and through the cup-shaped die 76, the lever 23 is provided with a cam shoulder 128 adapted as the lever 23 is moved clockwise to come into engagement with the free end of a slidable rod or bar 129 having one end attached to a short crank 130 and being provided with a slot 131 through which passes a stud or pin 132 by means of which rod 129 is free to slide on the back surface of the main block or casing 1. The crank 130 is rigidly secured to a rock shaft 133 (see Figs. 3 and 5), said rock shaft 133 being provided with an upwardly extending arm 134 which is in engagement with a pin 135 in a depending lever 136 pivoted at its upper end by a pin or stud 137 to a bracket 138, secured to the main block or casing 2. The depending lever 136 is provided with a substantially flat wire gripping surface 139 and with lugs 140 and 141 on each side thereof, said lugs being provided with small alined openings 142 and 143 respectively therethrough, of a diameter slightly greater than the diameter of the wire to be fed and said openings being slightly spaced above said wire gripping surface 139. Pivoted near the top of said lever 136 on a pin or stud 144, is a wire gripping lever 145 having a sharp edge 146 normally pressed into engagement with said gripping surface 139 by a leaf spring 147. An adjusting screw 148 is provided on said main block or casing 2 for regulating the amount of motion to be imparted to the lever 136 by the upwardly extending arm 134.

The rear portion 76′ of the cup-shaped die 76 forms one of a pair of shearing members for severing, from time to time, predetermined lengths of wire fed into the machine. The other shearing member consists of a hardened die 149, having a smooth face slidable over the smooth rear face of the cup-shaped die 76. Said hardened die 149 is preferably rigidly mounted in a lever 150 pivoted at one end on a stud 151 (see Fig. 2) and having its forward end connected to a bar 152, slidable substantially vertically on the face of the main block or casing 2 on a stud 153 passing through a slot 153′ in said bar 152. A spring 154 is attached to the connecting bar 152 and tends to draw upwardly on said bar 152 and lever 156 attached thereto and tends to normally hold the openings 149′ in the shearing die 149 and the opening 127 in the die 76 in axial alinement. The upper end of said bar 152 and the front end of said lever 150 are pivotally connected together by a bolt or pin 155 (see Fig. 2). The lower end of said sliding bar 152 is pivotally connected by a pin 152′ to the free end of a lever 156 pivoted on a stud or pin 157 to the front face of the main block or casing 2. Said lever 156 carries a block 158 arranged in the path of a projection 159 on the cam 43, said projection 159 engaging said block 158 at or near the end of the movement of said cam 43 in its clockwise oscillation. The lever 156 may be provided with a pin and slot connection 156' to steady the lever 156 in its movement and to limit the movement of the lever 156 in an upward direction when it is out of engagement with the projection 159.

Between the lever 150 and the feeding lever 136 is a tensioning device 160 comprising a block 161, having openings 161' therethrough in alinement with the opening 127 in the cup-shaped die 76, and a pin 162 of hard steel seated in said block 161. The upper surface of said pin 162 is substantially flat and is substantially tangential to the openings 161'—161' through said block 161. Above the pin 162 is a plunger 163 having a slightly convex surface in engagement with the pin 160 and provided with an outwardly extending stem 164 passing through an adjustable bushing 165. Between the plunger 163 and the inner end of the bushing 165 is a coiled spring 166, the tension of which is to force the plunger 163 into engagement with the top surface of the pin 162 of hard steel. The bushing 165 is preferably threaded into the block 161 so as to impart to the plunger any desired amount of pressure. The upper end of the plunger 163 is preferably provided with a knob or handle 167 whereby the plunger 163 may be manually lifted from out of its engagement with the pin 162. The wire 173 may be subjected to the degree of tension desired by passing the said wire between the plunger 163 and the pin 162, and this tensioning device prevents the movement of the tungsten wire 173 rearwardly out of opening 127 in the die 76 as the depending feeding lever 136 moves rearwardly to grip a new length of tungsten wire to be next fed through the shears and into the die 76.

At the rear of the groove 114 in the flat upper surface 62' of the needle carrier 62 is provided a plate or block 168 secured to the needle carrier 62 by a screw 169 to assist in guiding the needles fed thereto from the needle magazine 96 by the pusher rod 90.

The needle magazine, or more strictly the magazine in which the shank or body portion of the styli is placed and from which they are fed, one at a time, into the machine and are therein provided with tips or record-engaging points, is preferably separably mounted on the bracket 95 so that as fast as one magazine is emptied it may be replaced with another magazine filled with stylus bodies. To readily accomplish this, the bracket 95 is provided with a rectangular slot 175 (see Fig. 3) forming a seat into which the rectangular back of the needle magazine 96 fits. The magazine 96 is provided on its back with a headed stud 176 passing through a suitable opening in the bracket 95. On the back of the bracket 95 is a locking lever 177 pivoted on a pivot pin 178 and provided on its lower edge with a slot 179 fitting the sides of the stud 176. The magazine 96 may be removed from the bracket 95 by swinging the lever 177 upwardly clear of the head of the stud 176, and lifting the magazine out from the rectangular seat or slot 175. A new magazine may be used to replace the removed one by placing it in the seat 175, with the stud passing through the said opening in the bracket 95 and swinging the lever 177 downwardly. A weight 180 may be placed in the slot 96' of the needle magazine resting on top of the uppermost needle therein, to insure the downward feed of the needles or shanks in the slot 96'.

Before describing the operation of the machine, an understanding of the various steps of the process as carried out by the mechanism above described will be helpful and these steps are illustrated in a somewhat diagrammatic manner in Figs. 10 to 18 of the drawings.

The shank 170 of the stylus which is to be provided with a tungsten tip is illustrated in Figs. 10 and 11 and its tapered end 171 is preferably provided with a transverse slot 172. This shank, 170, is inserted by the needle feeding mechanism into the slot or groove 114 of the needle carrier 62 while the needle carrier 62 is stationary. The needle carrier 62 is then given a motion to the left to bring the tapered end 71 thereof into engagement with the interior surface of the cup 126 of the cup-shaped die 76, the fine tungsten wire 173 being then positioned in the minute axial opening 127 in the bottom of the cup-shaped die 76, passing from the reel 125 through the tensioning device 160 and through the cutting die 149 to the bottom of the cup-shaped opening 126 in the die 76. The device for feeding the wire 173 is then actuated to advance the tungsten wire into and to the bottom of the transverse slot 172 of the shank 170. A sharp blow is then imparted to the needle carrier 62 by the hammer head 55 with the result that the metal of the tapered end 171 of the shank 170 is swaged around the tungsten wire which was inserted therein. This swaging action causes the metal to tightly inclose the tungsten wire insert, operates to close the slot 172 on each side of the tungsten wire insert, and to so shape the tapered end 171 of the shank 170 as to make it substantially conform to the shape of the cup-shaped opening 126 in the die 76. The next step consists in operating the shears to sever the tungsten wire 173 at a short distance from the end of the shank 170 as illustrated in Fig. 17. After this has been done, the cutters return to their normal position with their openings in alinement with the opening 127 of the die 76 and the needle carrier 62 is moved rearwardly away from the die 76. At this point, the ejector mechanism is operated to suddenly move levers 108—109 and 110 upwardly to throw the shank 170, now provided with a tungsten wire tip, 174, (shown in Fig. 17) out of the needle carrier 62 into a suitable receptacle, whereupon the cycle of operations above described are repeated.

With this brief outline of the operations performed by the machine, the subject-matter of this application, a description of the operation of the sub-mechanisms thereof, will now be set forth, so far as is possible in the order in which they are actuated.

In all the figures, excepting Figs. 8 to 18 inclusive, the mechanism is shown at the beginning of the cycle of operations performed by it, the clutch member 9 having been thrown into engagement with the clutch member 12 and one lug 15 being just brought into engagement with the lug 16. The main shaft 4 and the parts connected thereto and operated thereby, turn in a clockwise direction, when viewed from the front of the machine. As the clutch member 12 now begins to turn with the shaft 4 through the clutch member 9, the cam 83, unitary with the clutch member 12, comes into almost immediate engagement with the roller 81 depending from the lever 79 and swings the lever 79 in the direction of the arrow 85. This motion of the lever 79 performs two functions, (1) it actuates the needle feeding mechanism and (2) it sets the needle ejecting mechanism. The operation of the needle feeding mechanism will first be described.

As the lever 79 swings in the direction of the arrow 85, the arm 87 carrying the stud or pin 88 slides the pusher rod 90 in the direction of the arrow 92. (See Fig. 7). This motion of the pusher rod 90 first brings the sharp edge 94 between the lowermost needle and the needle immediately above it in the needle magazine 96, the top surface of the plate 93 operating to prevent the needles above it from falling down and out of the magazine 96. This forward movement of the plate 93 holds the lowermost needle in the slot 97 of the lever 98 and as the forward beveled edge 90' of the pusher rod 90 engages the top surface of the spring pressed lever 98, it first depresses it against the action of the coiled spring 100 and when the edge 90' engages the lowermost needle it pushes it forwardly out of the groove 99, out of the lever 98 and over the top flat surface 62' of the needle carrier 62 until the needle reaches the groove 114 in the top surface of the needle carrier 62 into which groove it drops. The groove 114 is of a depth equal to the diameter of the needle or needle shank and the pusher rod, continuing its movement in the direction of the arrow 92, firmly holds the shank or needle 170 in the groove 114 by the engagement of under surface of the pusher rod 90 with the top of the needle, now in the groove 114. This action of the pusher rod is clearly illustrated in Figs. 7, 8 and 9.

The other mechanism operated by the lever 79 is the needle ejecting mechanism, the operation of which will now be described. Referring first to Figs. 2 and 6 as the lever 79 swings in the direction of the arrow 85, the projecting arm 119 moves the intermediate lever 120, by virtue of the engagement of the surface 119' of the arm 119 with the curved surface 122 of the arm 121 of the bell crank lever 120, turning it upon its stud or pivot 120' and moving the other arm 123 of the bell crank lever 120 inwardly or away from the front of the machine. This arm 123 is in engagement with the operating arm 104 of the bell crank lever 103 of the needle ejecting mechanism, said arm, 104, being spring pressed against the arm 123 by the spring 115. This motion swings the bell crank lever 103 and the needle ejecting fingers 108, 109, 110 carried thereby in an anticlockwise direction (when viewed in the position shown in Figs. 7, 8 and 9) until the needle ejecting fingers 108 and 109 come to rest in the slots 111 and 112 respectively in the top of the needle carrier 62, with the hooked ends 113 thereof below the groove 114 in the needle carrier 62. When the lever 79 has reached the full limit of its swing in the direction of the arrow 85 (Fig. 6) that is to say, when the cam surface 84 of the cam 83 has moved the roller 81, the full extent of the throw of said cam, the pusher rod 90 and the needle ejecting fingers 108, 109 and 110 are in the position shown in Fig. 9, the simultaneous movement of these two mechanisms being shown in Figs. 7, 8 and 9 of the drawings.

To effect this motion of the lever 78, the clutch member 12 and the cam 84 carried thereby, are turning loosely on the shaft 13 and the hub 25 of the resetting lever 23, without effecting any rotation of the shaft 13 or of resetting lever 23; and this movement of the clutch member 12 finally brings the pin 49 carried by the cam 83 into engagement with the surface 50 of the resetting lever 23. (See Fig. 5.) Immediately upon the engagement of the said pin 49 with the said flat surface 50, the resetting lever 23 begins to move in a clockwise direction with the driving shaft 4. The resetting lever 23 is pinned to the shaft 13 and causes the shaft 13 to rotate together with the parts carried thereby. This movement of the resetting lever 23 immediately moves the resetting rod 30 longitudinally against the action of the spring 32 bearing against the head 29 of the resetting rod and the coiled spring 32 is compressed as long as the resetting lever 23 continues to move with the main or driving shaft 4, and this movement continues until one of the cam lugs 18 of the clutch member 9 comes into engagement with the roller 20, and thereby withdraws the clutch member 9 from the coöperating clutch member 12. Immediately upon the complete separation of the clutch members 9 and 12, the resetting spring is free to act and forces the resetting rod 30 back to the position shown in Fig. 5. The resetting lever 23 is thus set back to the position shown in Fig. 5. This rapid return movement of the lever 23, under the influence of the spring 30, throws the clutch member 12 and the cam 83 carried thereby in an anticlockwise direction throwing the pin 49 back against the stop pin 51 projecting from the rear surface of the main casing 2. In this way the lever 23 is swung in one direction by the main shaft 4 until the clutch members 9 and 12 have been separated, whereupon the resetting spring 32 returns the lever 23 to its normal position shown in Fig. 5 and throws the cam 83 back to its normal position with the pin 49 adjacent the stop pin 51. This is the mechanism for imparting an oscillatory motion to the shaft 13 and it is during this oscillatory motion that the other mechanisms are operated. The spring 32 is a strong one and the head 29 of the resetting rod 30 strikes a hard blow upon the piston head 37 of the cushioning device 34. The function of the cushioning device 34 is to reduce the shock and noise that would result, without it, from the force of the blow of the resetting rod on its return to its normal position.

As the cam 43 on the front of the machine, and keyed to the shaft 13, moves with said shafting in a clockwise direction, (and it is to be noted that the cam 13 does not begin to turn until the cam 83 has imparted its full throw to the lever 79), it turns in a clockwise direction, when viewed from the front of the machine, and carries the projection 63 upwardly. The lever 64 follows the projection 63 upwardly, being held in engagement therewith by the spring 66, and the rock shaft 65 is thus turned by the spring 66. In other words, the movement of the projection 63 permits the spring 66 to move the rock shaft 65 in an anticlockwise direction, when viewed from the front of the machine. (See Fig. 1.) Referring now to Fig. 5, it will be seen that as the rock shaft 65 turns under the influence of the spring 66, the radial stud 69 moves to the left, but the depending stud 70 of the needle carrier 62, pressed against the stud 69 by the spring 72, follows the radial stud 69 during such motion. As the stud 69 moves to the left the needle carrier 62 moves to the left under the influence of the coiled spring 72 between the needle carrier 62 and the hammer casing 54 and this motion of the needle carrier to the left continues until the tapered end 171 of the needle shank 170, now in the groove 114 of the carrier 62, enters the cup-shaped die 76 and rests against the walls of the opening or recess 126 therein. This movement of the needle carrier and the needle or shank secured thereto is diagrammatically illustrated in Figs. 12 and 13. The needle is thus held firmly against the interior of the cup-shaped die 76 by the tension of the spring 72. This is the first operation which results from the rotation of the cam 43.

The second operation effected by the rotation of the cam 43 in a clockwise direction is to bring the spring pressed tooth 44 into engagement with the hardened steel pin 61 projected laterally from the hammer head 55 through the slot 60 of the hammer casing 54, and after the flat radial face 47 of the tooth 44 comes into engagement with said pin 61 it moves the hammer to the right, against the action of the stiff hammer spring 59, thus compressing the said coiled spring 59. As the cam 49 continues its rotation, it passes below and out of engagement with the pin 51, whereupon the hammer spring 59 is free to act, and it impels the hammer head 55 to the left, striking a sharp heavy blow on the needle carrier 62. During the time that the hammer head is being moved against the tension of the hammer spring 59 and before the hammer head is released from the tooth 44, the cam shoulder 128 (see Fig. 5) on the lever 23 has come into engagement with the slidable rod 129, has pushed it longitudinally, and has turned the rock shaft 133, thus moving the arm 134 against the pin 135 carried by the depending lever 136, and swinging the lever 136 and the parts carried thereby to the left. This movement of the lever 136 is operative to feed the fine wire 173 from the reel 125, and between the tensioning parts of the tensioning device 160, and to push the free end of the fine wire 173 against the bottom of the channel or slot 172 in the tapered end of the shank 170 as is illustrated diagrammatically in Fig. 14 of the drawings. Substantially the instant, however, the tungsten wire 173 has reached the position shown in Fig. 14, the hammer head is released from the tooth 44 and imparts its blow to the needle carrier. This blow forces the tapered end of the shank 170 into the interior of the die 76. The said blow thus imparted to the stylus or shank 170, swages the metal of the tapered end 171 around the tungsten wire 173 thus inserted, closing the slot 172 and forcing the metal around the tungsten stylus into exceedingly tight and rigid engagement therewith. The tungsten wire insert is thus made substantially integral or unitary with the steel shank 170. It may not be in fact absolutely integral with it, but it is so tightly and firmly united therewith as to form a substantially unitary structure. Just after the pin 61 has been released from the tooth 44 and the hammer has struck its blow against the needle carrier, the projection 159 on the cam 43 comes into engagement with the block 158 on the lever 156 and pressing it downwardly draws downwardly the connecting bar 162 and the shearing lever 150 connected thereto and severs the tungsten wire at a short distance from the tapered end 171 of the shank 170.

It is immediately after the tungsten wire has been thus severed that the tooth 44 slips from under the pin 61; the cam lugs 18—18 effect a separation of the clutch members 9 and 12; and the shaft 13 is turned in an anti-clockwise direction under the influence of the resetting spring 32. In returning to its original position the tapered or inclined face 48 of the tooth 44, striking against the pin 61, forces the tooth 41 into the cam 43 against the action of the tensioning spring 46 and thus permits the uninterrupted movement of the shaft 13 until it has returned to its original position.

In returning to its original position, the projection 62 comes again into engagement with the lever 64 and turns the rock shaft 65 to move the needle carrier 62 back to its original position, shown in Fig. 5, and the return of the pusher rod 90 to its original positions is the last operation effected during the movement of the shaft 13 in its reverse direction, and therefore the pusher rod 90 is operative to hold the completed needle in the groove 114. The first part of the movement of the lever 79 in its return motion moves the intermediate bell crank lever throwing the arm 123 away from the arm 104 of the bell crank lever 103, but the bell crank lever 103 is not free to move under the influence of the spring 115 because the hooked ends 113 of the needle ejecting fingers 108, 109 and 110 are under the needle, and the needle is held in the slot 114 by the pusher rod 90. Immediately, however, the pusher rod 90 moves to the rear and out of engagement with the top of the needle in the groove 114, the spring 115 draws the lever arm 105 sharply downwardly, rocking the bell crank lever 103 on its stud 106 and throwing the completed needle upwardly out of the machine with considerable force into a receptacle (not shown) suitably located with respect to the machine.

The transverse slot 172 in the end of the shank 170 may have parallel sides as shown in Figs. 10 to 14 but in order to insure the threading of the tungsten wire into the slot without striking against the forward edge of the tapered end 171, I prefer to provide the shank with a slot 172' slightly V-shaped as shown in Fig. 18. The bottom of the slot 172' is of substantially the width of the diameter of the tungsten wire insert. The end of the shank provided with the slot 172' such as is shown in Fig. 18, is perhaps even more readily tightly swaged around a tungsten wire insert, in the machine, above described than is the shank having a parallel-sided slot 172. In any event, the slot 172' is substantially as readily entirely closed after the blow has been struck by the hammer 52 as is the slot 172 with substantially parallel sides.

The bottom of the slot 114 is of the same shape as one-half of the stylus shank and the depth of the slot 114 is substantially equal to the diameter or width of the stylus shank. When, therefore, the pusher rod 90 is over the slot 114 (see Fig. 9), the underside of the pusher rod bears against the top of the stylus shank, holding the shank tightly against the bottom of the groove in the carrier 62. In this way the shank is prevented from opening or springing laterally when the blow of the hammer 52 is imparted thereto. It is clear that the arrangement of the various mechanisms for performing the different operations illustrated herein may be widely varied within the scope of this invention as defined in the claims without departing from the spirit thereof and the form of mechanism which has been described and illustrated is merely one exemplification of the invention and it is not intended to limit the scope of the claims to the exact details shown herein.

Having thus described my invention, what I claim and desire to protect by Letters Patent is:

1. In a machine for making styli composed of a shank and a tip, the combination of a die, means for supporting and holding the shank forming material, means for holding the tip forming material, means for causing a relative movement between the respective holding means in the direction of the length of said shank material and in a line with the center of the die to bring said tip forming and shank forming material into endwise engagement, and means to deliver a swaging blow to join the tip and shank when the materials are in said engaging position.

2. In a machine for making styli composed of a shank and a tip of different material, the combination of a hollow die, means to hold the die and the material forming the stylus shank in operative engagement, means to feed through said die the material adapted to form the tip and bring said tip and shank material into position in which the shank incloses a part of the tip, and means to impart a blow to swage that part of said shank within the die around said tip and force it into tight holding unitary engagement therewith.

3. In a machine for making styli having a shank and a tip of different material, the combination of a hollow die, means to feed a length of tip forming material through said die, means supporting and holding the shank forming material, means for causing a relative movement between said last-mentioned means and said die in the direction of the length of the shank and in line with the center of the die to bring said tip and shank material into endwise engagement, and means to deliver a swaging blow to join the tip and shank when the materials are in said engaging position.

4. In a machine for making compound styli, the combination of a hollow die, means to feed a length of tungsten wire through said die, means to feed a length of shank material endwise in a line coincident with the line of feed of said wire to bring the wire and shank into endwise engagement, and means to deliver a swaging blow to said materials to join the wire and shank into tight holding relation.

5. In a machine for making compound styli, the combination of a hollow die, means to feed a length of tungsten wire through said die, means to feed a length of shank material endwise in a line coincident with the line of feed of said wire to bring the wire and shank into endwise engagement, and means to deliver an endwise swaging blow to said materials to join the wire and shank into tight holding relation.

6. In a machine for making styli for sound reproducing machines, the combination of a carrier, means for feeding a stylus shank to said carrier, a hollow die having an opening through the bottom thereof, means for moving said carrier to bring said shank into alined engagement with the interior of said die, said shank having a recess in the end thereof, means to insert a length of wire through said opening in said die into said recess in said shank, and means to impart a blow to said shank to force the material of the end of the said shank into tight holding engagement with said wire.

7. In a machine for making styli for sound reproducing machines, the combination of a carrier, means for feeding a stylus shank to said carrier, a hollow die having an opening through the bottom thereof, means for moving said carrier to bring said shank into alined engagement with the interior of said die, said shank having a recess in the end thereof, means to insert a length of wire through said opening in said die into said recess in said shank, means to impart a blow to said shank to force the material of the end of the said shank into tight holding engagement with said wire, and means to sever said wire at a short distance from the end of said shank.

8. In a machine for making styli for sound reproducing machines, the combination of a carrier, means for feeding a stylus shank to said carrier, a hollow die having an opening through the bottom thereof, means for moving said carrier to bring said shank into alined engagement with the interior of said die, said shank having a recess in the end thereof, means to insert a length of wire through said opening in said die into said recess in said shank, means to impart a blow to said shank to force the material of the end of the said shank into tight holding engagement with said wire, means to sever said wire at a short distance from the end of said shank, and means to move said carrier and said stylus away from said die.

9. In a machine for making styli for sound reproducing machines, the combination of a carrier, means for feeding a stylus shank to said carrier, a hollow die having an opening through the bottom thereof, means for moving said carrier to bring said shank into alined engagement with the interior of said die, said shank having a recess in the end thereof, means to insert a length of wire through said opening in said die into said recess in said shank, means to impart a blow to said shank to force the material of the end of the said shank into tight holding engagement with said wire, means to sever said wire at a short distance from the end of said shank, means to move said carrier and said stylus away from said die, and means to eject from said carrier the stylus so formed and provided with a record-engaging end unitary therewith.

10. In a machine for making styli for sound reproducing machines, the combination of a stylus carrier, having a groove therein, means to feed a stylus shank into said groove, said groove being of a shape to fit and conform to the shape of one-half of said stylus and of a depth equal to the thickness of said stylus, means to hold said stylus in said groove, a die in alinement with said stylus in said groove and provided with an opening in the bottom thereof, means to move said die to bring the end of said stylus into engagement with the interior of said die, means to feed a fine tungsten wire through the opening in said die and into a recess in the adjacent end of said stylus, and means to strike a swaging blow against said carrier and stylus carried thereby to force the end of said stylus within said die into tight holding relation with respect to said tungsten wire.

11. In a machine for making styli for sound reproducing machines, the combination of a stylus carrier, having a groove therein, means to feed a stylus shank into said groove, said groove being of a shape to fit and conform to the shape of one-half of said stylus and of a depth equal to the thickness of said stylus, means to hold said stylus in said groove, a die in alinement with said stylus in said groove and provided with an opening in the bottom thereof, means to move said die to bring the end of said stylus into engagement with the interior of said die, means to feed a length of tungsten wire through the opening in said die and into said groove in the end of said stylus, means to strike a swaging blow against said carrier and stylus carried thereby to force the end of said stylus within said die into tight holding relation with respect to said tungsten wire, and means to sever said tungsten wire at a point spaced from the end of said shank.

12. In a machine for making styli for sound reproducing machines, the combination of a shank holder, means for feeding the shank material to said holder, a hollow die having an opening through the bottom thereof, means to bring the shank held in said holder and die into alined engagement, means to feed a length of wire through said opening in said die, said wire adapted to be inserted into a recess in the shank, means to impart a blow to the shank to force the material of the end of the shank into tight holding engagement with said wire, and means to sever said wire at a short distance from the end of the shank.

13. In a machine for making styli for sound reproducing machines, the combination of means to hold the stylus shank, means to feed the shank to said holding means, a hollow die having an opening through the bottom thereof, means for bringing the shank held in said holder and die into alined engagement, means to feed a length of wire through said opening in said die, said wire adapted to be inserted into a recess in the shank, means to impart a blow to said shank to force the material of the end of the shank into tight holding engagement with said wire, means to sever said wire at a short distance from the end of the shank, and means to separate the shank and die from alined engagement.

14. In a machine for making styli for sound reproducing machines, the combination of means to hold the stylus shank, means to feed the shank to said holding means, a hollow die having an opening through the bottom thereof, means for bringing the shank and die into alined engagement, means to insert a length of wire through said opening in said die, said wire adapted to be inserted into a recess in the shank, means to impart a blow to said shank to force the material of the end of the shank into tight holding engagement with said wire, means to sever said wire at a short distance from the end of the shank, means to separate the shank and die from alined engagement, and means to remove from the holder the stylus so formed.

In witness whereof, I have hereunto set my hand this 27th day of April, 1916.

WILLIAM W. MOYER.